United States Patent
Indo et al.

(10) Patent No.: US 10,746,019 B2
(45) Date of Patent: Aug. 18, 2020

(54) METHOD TO ESTIMATE SATURATION PRESSURE OF FLOW-LINE FLUID WITH ITS ASSOCIATED UNCERTAINTY DURING SAMPLING OPERATIONS DOWNHOLE AND APPLICATION THEREOF

(71) Applicant: Schlumberger Technology Corporation, Sugar Land, TX (US)

(72) Inventors: Kentaro Indo, Sugar Land, TX (US); Julian J. Pop, Houston, TX (US); Ji Qi, Houston, TX (US); Sepand Ossia, Arlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 94 days.

(21) Appl. No.: 15/772,535

(22) PCT Filed: Nov. 1, 2016

(86) PCT No.: PCT/US2016/059959
§ 371 (c)(1),
(2) Date: May 1, 2018

(87) PCT Pub. No.: WO2017/079179
PCT Pub. Date: May 11, 2017

(65) Prior Publication Data
US 2018/0320517 A1 Nov. 8, 2018

Related U.S. Application Data

(60) Provisional application No. 62/251,262, filed on Nov. 5, 2015.

(51) Int. Cl.
*E21B 49/10* (2006.01)
*E21B 47/06* (2012.01)
(Continued)

(52) U.S. Cl.
CPC .............. *E21B 49/10* (2013.01); *E21B 47/06* (2013.01); *G01L 11/02* (2013.01); *G01V 8/00* (2013.01); *E21B 2049/085* (2013.01)

(58) Field of Classification Search
CPC .... E21B 49/10; E21B 47/06; E21B 2049/085; G01L 11/02; G01V 8/00
See application file for complete search history.

(56) References Cited

U.S. PATENT DOCUMENTS 5,329,811 A 7/1994 Schultz et al.
5,473,939 A 12/1995 Leder et al.
(Continued)

OTHER PUBLICATIONS

International Search Report and Written Opinion issued in International Patent application PCT/US2016/059959 dated Feb. 1, 2017. 14 pages.
(Continued)

*Primary Examiner* — Brad Harcourt

(57) ABSTRACT

A method includes pumping fluid from outside of a downhole tool through a flowline of the downhole tool with a pump. The method further includes taking a first plurality of measurements over time using at least one sensor and estimating a future saturation pressure of the fluid within the flowline at constant time increments via a processor based at least in part on the first plurality of measurements and a saturation pressure model. The method further includes adjusting the flowline pressure to maintain the pressure of the flowline above the estimated future saturation pressure.

18 Claims, 9 Drawing Sheets

(51) Int. Cl.
*G01L 11/02* (2006.01)
*G01V 8/00* (2006.01)
*E21B 49/08* (2006.01)

(56) References Cited

U.S. PATENT DOCUMENTS

| | | | |
|---|---|---|---|
| 6,334,489 | B1 | 1/2002 | Shwe et al. |
| 7,222,524 | B2 | 5/2007 | Shammai |
| 7,346,460 | B2 | 3/2008 | DiFoggio et al. |
| 7,461,547 | B2 | 12/2008 | Terabayashi et al. |
| 7,774,141 | B2 | 8/2010 | Li |
| 7,966,273 | B2 | 6/2011 | Hegeman et al. |
| 8,024,125 | B2 | 9/2011 | Hsu et al. |
| 8,672,026 | B2 | 3/2014 | van Zuilekom et al. |
| 9,115,567 | B2 | 8/2015 | Hsu et al. |
| 9,169,727 | B2 | 10/2015 | Hsu et al. |
| 9,334,724 | B2 | 5/2016 | Hsu et al. |
| 2004/0231408 | A1* | 11/2004 | Shammai ............ E21B 49/10 73/152.27 |
| 2007/0119244 | A1* | 5/2007 | Goodwin ............ E21B 47/10 73/152.28 |
| 2008/0040086 | A1 | 2/2008 | Betancourt et al. |
| 2011/0218736 | A1 | 9/2011 | Pelletier |
| 2012/0222852 | A1 | 9/2012 | Pelletier |
| 2013/0219997 | A1 | 8/2013 | Sullivan et al. |
| 2013/0340518 | A1 | 12/2013 | Jones et al. |
| 2014/0096957 | A1 | 4/2014 | van Zuilekom et al. |
| 2014/0268156 | A1 | 9/2014 | Smythe et al. |
| 2015/0013968 | A1 | 1/2015 | Hsu et al. |

OTHER PUBLICATIONS

Oil Bubblepoint Pressure. PetroWiki webpage at http://petrowiki.org/Oil_bubblepoint_pressure Published by Socitey of Petroleum Engineers. Jul. 7, 2016.

Indo, K. et al., Estimation of Fluid Composition From Downhole Optical Spectrometry. SPE166464. SPE Annual Technical Conference and Exhibition, New Orleans, LA, Sep. 30-Oct. 2, 2013. 13 pages.

Efron, B., Bootstrap Methods: Another Look at the Jackknife. The Annals of Statistics vol. 7 No. 1, 1979. pp. 1-26.

* cited by examiner

METHOD TO ESTIMATE SATURATION PRESSURE OF FLOW-LINE FLUID WITH ITS ASSOCIATED UNCERTAINTY DURING SAMPLING OPERATIONS DOWNHOLE AND APPLICATION THEREOF

BACKGROUND

This disclosure relates to generally to oil and gas exploration systems and more particularly to methods for estimating saturation pressure by sampling formation fluids.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light.

Wells are generally drilled into a surface (land-based) location or ocean bed to recover natural deposits of oil and natural gas, as well as other natural resources that are trapped in geological formations. A well may be drilled using a drill bit attached to the lower end of a "drill string," which includes a drillpipe, a bottom hole assembly, and other components that facilitate turning the drill bit to create a borehole. Drilling fluid, or "mud," is pumped down through the drill string to the drill bit during a drilling operation. The drilling fluid lubricates and cools the drill bit, and it carries drill cuttings back to the surface through an annulus between the drill string and the borehole wall.

For oil and gas exploration, it may be desirable to have information about the subsurface formations that are penetrated by a borehole. More specifically, this may include determining characteristics of fluids stored in the subsurface formations. As used herein, fluid is meant to describe any substance that flows. Fluids stored in the subsurface formations may include formation fluids, such as natural gas or oil. Thus, a fluid sample representative of the formation fluid maybe taken by a downhole tool and analyzed. As used herein, a representative fluid sample is intended to describe a sample that has relatively similar characteristics (e.g., composition and state) to the formation fluid to facilitate determining characteristics of the formation fluid.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a method includes pumping fluid from outside of a downhole tool through a flowline of the downhole tool with a pump. The method further includes taking a first plurality of measurements over time using at least one sensor and estimating a future saturation pressure of the fluid within the flowline at constant time increments via a processor based at least in part on the first plurality of measurements and a saturation pressure model. The method further includes adjusting the flowline pressure to maintain the pressure of the flowline above the estimated future saturation pressure.

In another embodiment, a downhole fluid testing system includes a downhole acquisition tool housing configured to be moved into a wellbore in a geological formation, wherein the wellbore or the geological formation, or both, contain fluid that comprises a native reservoir fluid of the geological formation and a contaminant. The downhole fluid testing system includes a pump configured to pump fluid through the downhole acquisition tool to reduce a contamination level of the fluid, an optical spectrometer configured to measure optical densities of the fluid in the flowline using a plurality of wavelengths, a plurality of sensors disposed in the downhole acquisition tool housing that is configured to analyze portions of the fluid and obtain a fluid property the fluid, wherein the fluid property includes an optical density, and a controller. The controller takes a first plurality of measurements over time using at least one sensor, estimates a future saturation pressure of the fluid within the flowline at constant time increments via a processor based at least in part on the first plurality of measurements and a saturation pressure model, and adjusts the flowline pressure to maintain the pressure of the flowline above the estimated future saturation pressure.

In a further embodiment, an apparatus includes at least one non-transitory, tangible, machine-readable media having instructions encoded thereon for execution by a processor. The instructions include instructions to take a first plurality of measurements over time using at least one sensor. The instructions further include instructions to estimate a future saturation pressure of the fluid within the flowline at constant time increments via a processor based at least in part on the first plurality of measurements and a saturation pressure model. The instructions further include instructions to adjust the flowline pressure to maintain the pressure of the flowline above the estimated future saturation pressure.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
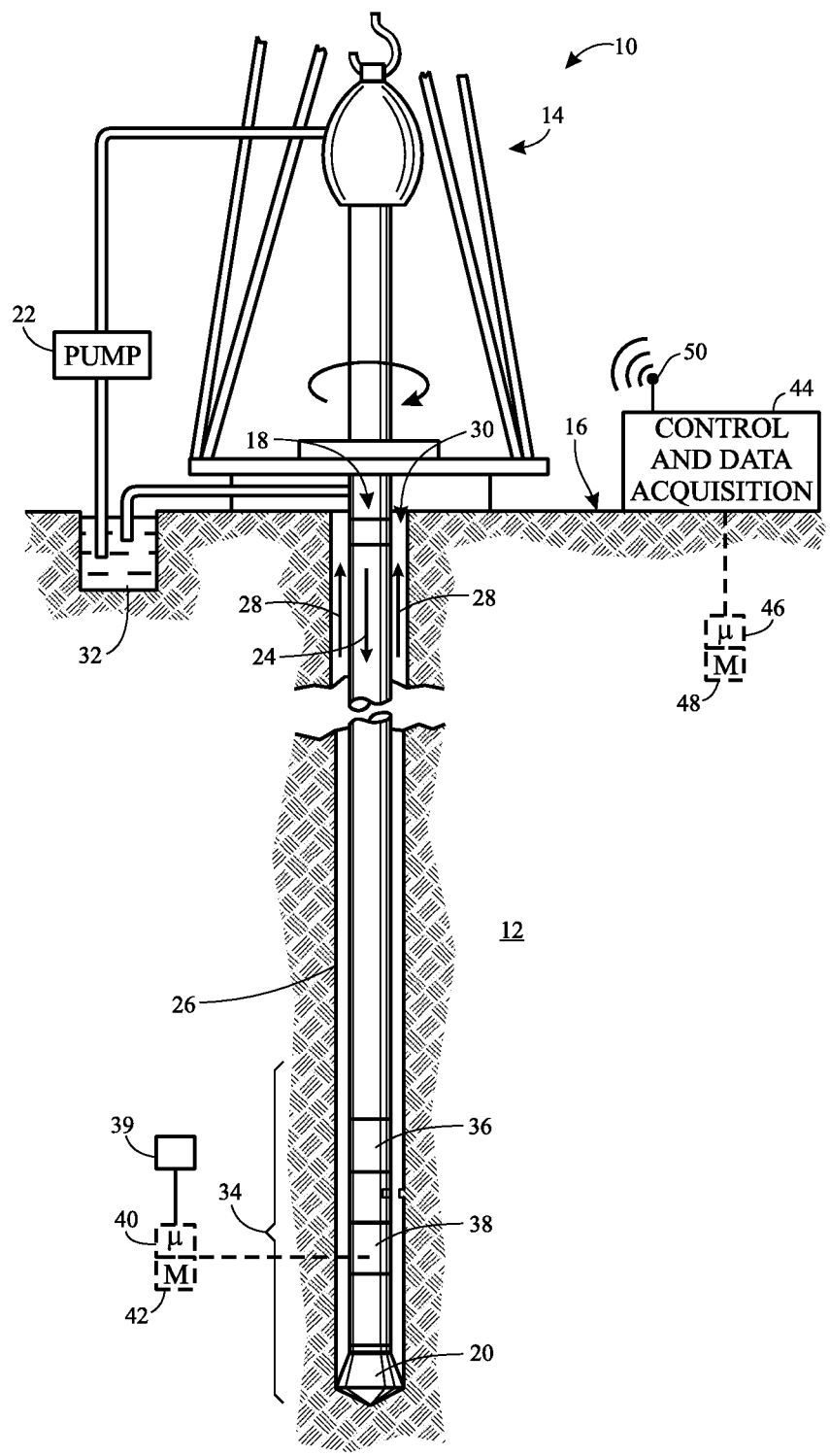
FIG. 1 is a schematic diagram of a drilling system including a downhole tool used to sample formation fluid, in accordance with an embodiment of the present techniques.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions can be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of this disclosure relate to operating a pump in a downhole tool to capture a fluid sample representative of a formation fluid. This disclosure generally relates to operating a pump in a downhole tool to capture a fluid sample representative of a formation fluid. During oil or natural gas exploration, it may be desirable to measure and/or evaluate the properties of the formations surrounding a borehole. For example, this may include capturing and evaluating a sample of fluid trapped in the formations, which may be referred to as formation fluid. When capturing such a sample, it is desirable that the sample be representative of the formation fluid. More specifically, the sample may have a similar composition and state as the formation fluid. However, in many drilling operations, drilling fluid (e.g., drilling mud) is often pumped into the borehole to facilitate drilling. As the drilling mud is cycled through the drilling process, the filtrate of drilling fluid may seep into the formations and mix with (e.g., contaminate) the formation fluid close to the borehole. In addition, in many fluid sampling operations, a pump is used to pump surrounding fluid into a downhole tool. More specifically, the pump may reduce the pressure in the downhole tool below the pressure in the formation (e.g., formation pressure). Depending on the composition of fluid pumped into the downhole tool, the reduction in pressure may cause a state change (e.g., release of gas, liquid, asphaltene, or the like) if the pressure is reduced below a saturation pressure (e.g., dew point pressure, bubble point pressure, asphaltene onset pressure, or the like). As used herein, the saturation pressure refers to a threshold pressure under an isothermal condition that may cause a state change such as a dew point pressure for a gas (e.g., natural gas), a bubble point pressure for a liquid (e.g., oil), an asphaltene onset pressure for a liquid (e.g., oil), or the like.

Traditional techniques may capture a contaminated fluid sample (e.g., containing an appreciable amount of drilling fluid filtrate) in a controlled volume and decrease the pressure in the controlled volume to determine the saturation pressure of the contaminated fluid sample. The determined saturation pressure may then be used in a pump equation to determine a pumping rate designed to avoid dropping the pressure in the downhole tool below the saturation pressure. However, these features may be inefficient. For example, because space in a downhole tool is limited, the additional controlled volume capable of decreasing pressure utilized by these techniques may occupy space in the tool that could be used for other purposes. Furthermore, because the properties (e.g., contamination level) of the fluid pumped into a downhole tool may change, a pumping rate determined at one time during pumping may be inaccurate if used at a later time when the contamination level may have changed. For example, when the contamination level and the saturation pressure are high, the pump may be controlled to pump faster than the determined pumping rate obtained from some other contamination level while maintaining the pressure in the downhole tool greater than the saturation pressure. Thus, it may be desirable to provide techniques for operating a pump in a downhole tool to facilitate efficient sampling of the formation fluid when the contamination level and saturation pressure of fluid in the flowline changes during pumping.

Accordingly, the present disclosure includes a system and method for operating a pump in a downhole tool to capture a fluid sample representative of the formation fluid. More specifically, the present techniques may include: pumping fluid from outside of the downhole tool through a flowline of the downhole tool, taking a measurements within the flowline while pumping the fluid using at least one sensor, estimating a saturation pressure of the fluid with the processor based at least in part on the measurements taken in the flowline and a saturation pressure model, and adjusting an operating parameter of a pump with a controller to maintain pressure in the flowline greater than the estimated saturation pressure. In other words, the saturation pressure of the fluid may be estimated directly from measurements, such as optical density, taken while the fluid is being pumped through the flowline of the downhole tool. For example, in some embodiments, an optical spectrometer may be used to measure the optical density of the fluid in the flowline across several wavelengths. The optical density measurements may be used to obtain compositional information to be employed to model the saturation pressure. In certain embodiments, the optical density measurements may be directly input into the saturation pressure model to provide estimates of saturation pressure. The estimated saturation pressures may then be employed to control the pump to maximize the pumping rate while maintaining the pressure in the flow line greater than the estimated saturation pressure. In certain embodiments, the estimated saturation pressure can be adjusted by a corrective parameter to estimate a future saturation pressure if the flow line pressure goes below the bubble point of the fluid.

By way of introduction, FIG. 1 illustrates a drilling system 10 used to drill a well through subsurface formations 12. A drilling rig 14 at the surface 16 is used to rotate a drill string 18 that includes a drill bit 20 at its lower end. As the drill bit 20 is rotated, a drilling fluid pump 22 is used to pump drilling fluid, commonly referred to as "mud" or "drilling mud," downward through the center of the drill string 18 in the direction of the arrow 24 to the drill bit 20. The drilling fluid, which is used to cool and lubricate the drill bit 20, exits the drill string 18 through ports (not shown) in the drill bit 20. The drilling fluid then carries drill cuttings away from the bottom of a borehole 26 as it flows back to the surface 16, as shown by the arrows 28 through an annulus 30 between the drill string 18 and the formation 12. However, as described above, as the drilling fluid flows through the annulus 30 between the drill string 18 and the formation 12, the drilling mud may begin to invade and mix with the fluids stored in the formation, which may be referred to as formation fluid (e.g., natural gas or oil). At the surface 16, the return drilling fluid is filtered and conveyed back to a mud pit 32 for reuse.

Furthermore, as illustrated in FIG. 1, the lower end of the drill string 18 includes a bottom-hole assembly 34 that may include the drill bit 20 along with various downhole tools (e.g., modules). For example, as depicted, the bottom-hole assembly 34 includes a measuring-while-drilling (MWD) tool 36 and a logging-while-drilling (LWD) tool 38. The various downhole tools (e.g., MWD tool 36 and LWD tool 38) may include various logging tools, measurement tools, sensors, devices, formation evaluation tools, fluid analysis tools, fluid sample devices, and the like to facilitate determining characteristics of the surrounding formation 12 such as the properties of the formation fluid. For example, the LWD tool 38 may include a fluid analysis tool (e.g., an optical spectrometer 39) to measure light transmission of the fluid in the flowline, a processor 40 to process the measurements, and memory 42 to store the measurements and/or computer instructions for processing the measurements.

As used herein, a "processor" refers to any number of processor components related to the downhole tool (e.g., LWD tool 38). For example, in some embodiments, the processor 40 may include one or more processors disposed within the LWD tool 38. In other embodiments, the processor 40 may include one or more processors disposed within the downhole tool (e.g., LWD tool 38) communicatively coupled with one or more processors in surface equipment (e.g., control and data acquisition unit 44). Thus, any desirable combination of processors may be considered part of the processor 40 in the following discussion. Similar terminology is applied with respect to the other processors described herein, such as other downhole processors or processors disposed in other surface equipment.

In addition, the LWD tool 38 may be communicatively coupled to a control and data acquisition unit 44 or other similar surface equipment. More specifically, via mud pulse telemetry system (not shown), the LWD tool 38 may transmit measurements taken or characteristics determined to the control and data acquisition unit 44 for further processing. Additionally, in some embodiments, this may include wireless communication between the LWD tool 38 and the control and data acquisition unit 44. Accordingly, the control and data acquisition unit 44 may include a processor 46, memory 48, and a wireless unit 50.

Figure 2:
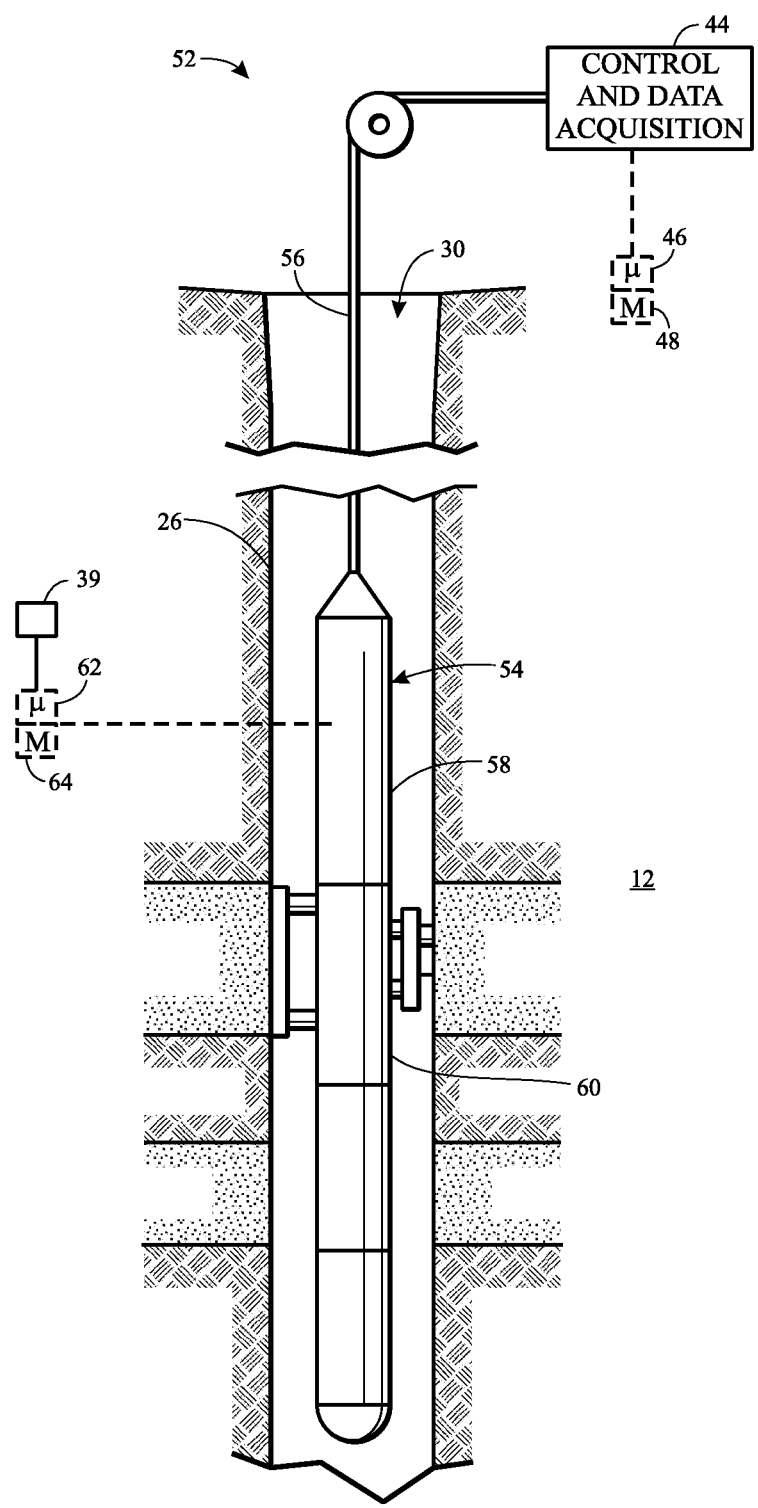
FIG. 2 is a schematic diagram of a wireline system including a downhole tool used to sample formation fluid, in accordance with an embodiment of the present techniques.

In addition to being included in the drilling system 10, various downhole tools (e.g., wireline tools) may also be included in a wireline system 52, as depicted in FIG. 2. As depicted, the wireline system 52 includes a wireline assembly 54 suspended in the borehole 26 and coupled to the control and data acquisition unit 44 via a cable 56. Similar to the bottom-hole assembly 34, various downhole tools (e.g., wireline tools) may be included in the wireline assembly 54. For example, as depicted, the wireline assembly 54 includes a telemetry tool 58 and a formation testing tool 60. In some embodiments, the formation testing tool 60 may take measurements and communicate the measurements to the telemetry tool 58 to determine characteristics of the formation 12. For example, similar to the LWD tool 38, the formation testing tool 60 may include a fluid analysis tool (e.g., an optical spectrometer 39) to measure light transmission of fluid in the flowline, and the telemetry tool 58 may include a processor 62 to process the measurements and memory 64 to store the measurements and/or computer instructions for processing the measurements. Thus, in some embodiments, the telemetry tool 58 may be included in the formation testing tool 60. The formation testing tool 60 may be communicatively coupled to the control and data acquisition unit 44 and transmit measurements taken or characteristics determined to the control and data acquisition unit 44 for further processing.

In other embodiments, features illustrated in FIGS. 1 and 2 may be employed in a different manner. For example, various downhole tools may also be conveyed into a borehole via other conveyance methods, such as coil tubing or wired drill pipe. For example, a coil tubing system may be similar to the wireline system 52 with the cable 56 replaced with a coiled tube as a method of conveyance, which may facilitate pushing the downhole tool further down the borehole 26.

Figure 3:
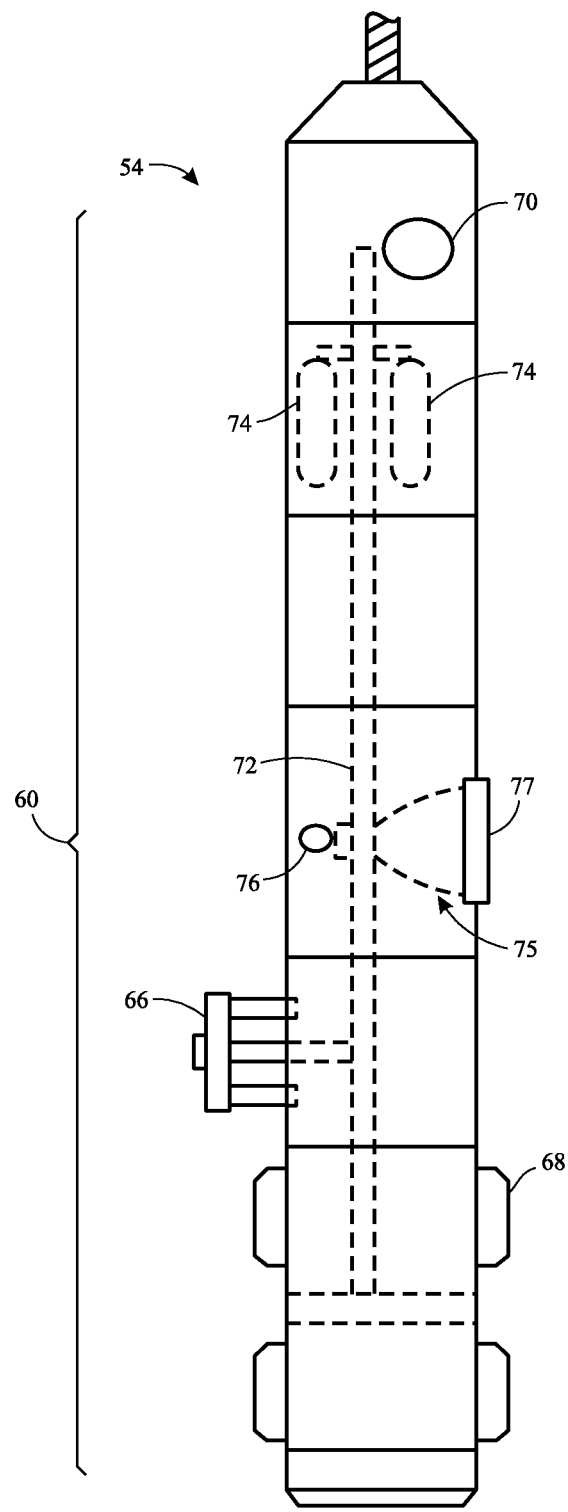
FIG. 3 is a schematic diagram of the downhole tool of FIG. 2 used to determine formation fluid properties, in accordance with an embodiment of the present techniques.

As described above, to facilitate determining characteristics of the formations 12 surrounding the borehole 26, samples of fluid representative of the formation fluid may be taken. More specifically, the samples may be gathered by various downhole tools such as the LWD tool 38, a wireline tool (e.g., formation sampling tool 60), a coil tubing tool, or the like. To help illustrate, a schematic of the wireline assembly 54, including the formation sampling tool 60, is depicted in FIG. 3. It should be appreciated that the techniques described herein may also be applied to LWD tools and coil tubing tools.

To begin sampling the fluids in the formation 12 surrounding the formation sampling tool 60, the formation sampling tool 60 may engage the formation in various manners. For example, in some embodiments, the formation sampling tool 60 may extend a probe 66 to contact the formation 12, and formation fluid may be withdrawn into the sampling tool 60 through the probe 66. In other embodiments, the formation sampling tool 60 may inflate packers 68 to isolate a section of the formation 12 and withdraw fluid into the formation 12 through an opening in the sampling tool between the packers. In a further embodiment, a single packer may be inflated to contact the formation 12, and fluid from the formation may be drawn into the sampling tool 60 through an inlet (e.g., a drain) in the single packer.

Once the formation sampling tool 60 has engaged the formation 12, a pump 70 may extract fluid from the formation by decreasing the pressure in a flowline 72 of the formation sampling tool 60. As described above, when the pump 70 initially begins to extract fluid from the surrounding formation 12, the extracted fluid may be contaminated (e.g., contain an appreciable amount of drilling fluid filtrate) and be unrepresentative of the formation fluid. Accordingly, the pump 70 may continue to extract fluid from the formation 12 until it is determined that a representative fluid sample (e.g., single-phase with minimal contamination) may be captured. Various methods are known to determine the contamination level of the fluid in the flowline 72. One such method is based on analyzing optical spectrometer data, and is described in more detail in U.S. Pat. No. 8,024,125 entitled "Methods and Apparatus to Monitor Contamination Levels in a Formation Fluid," which is incorporated herein by reference. For example, in certain embodiments, the contamination level may be monitored using a trend model that compares optical densities of the formation fluid at different wavelengths. During the initial pumping process, the pump 70 may expel the extracted fluid back into the annulus 30 at a different location (not shown) from the sample point (e.g., the location of the probe 66). A representative fluid sample may be captured in sample bottles 74 in the formation sampling tool 60 when a minimum contamination level is achieved.

As depicted in FIG. 3, the formation sampling tool 60 also includes a fluid analysis tool 75. The fluid analysis tool 75 may take various measurements on fluid flowing through the flowline 72, such as optical density or ultrasonic transmission. For example, the fluid analysis tool 75 may be an optical spectrometer 39 that takes optical density measurements by measuring light transmission of fluid as it is pumped through the flowline 72. In some embodiments, the optical spectrometer 39 may take a plurality of measurements by measuring light transmission across multiple wavelengths. Accordingly, the fluid analysis tool 75 (e.g., optical spectrometer 39) may include a light emitter or source 76 and a light detector or sensor 77 disposed on opposite sides of the flowline 72. More specifically, the fluid analysis tool 75 may determine the proportion of light transmitted through the fluid and detected by the light sensor 77.

Furthermore, as described above, the decrease of pressure in the flowline 72 while extracting fluid from the formation 12 and pumping the fluid through the flowline may cause the fluid to drop below its saturation pressure (e.g., dew point, bubble point, or asphaltene onset). For example, when the pressure in the flowline 72 is dropped below a dew point pressure of a gas (e.g., natural gas), liquid droplets may begin to form. Similarly, when the pressure in the flowline 72 is dropped below a bubble point of a liquid (e.g., oil), gas may be released. As will be described in more detail below, such phase changes and their onset may be detected and determined by the fluid analysis tool 75. For example, as bubbles begin to form in a liquid (e.g., oil), the fluid analysis tool 75 (e.g., optical spectrometer 39) may determine the bubble point of the liquid because the bubbles scatter light and cause light transmission to sharply decrease.

Figure 4:
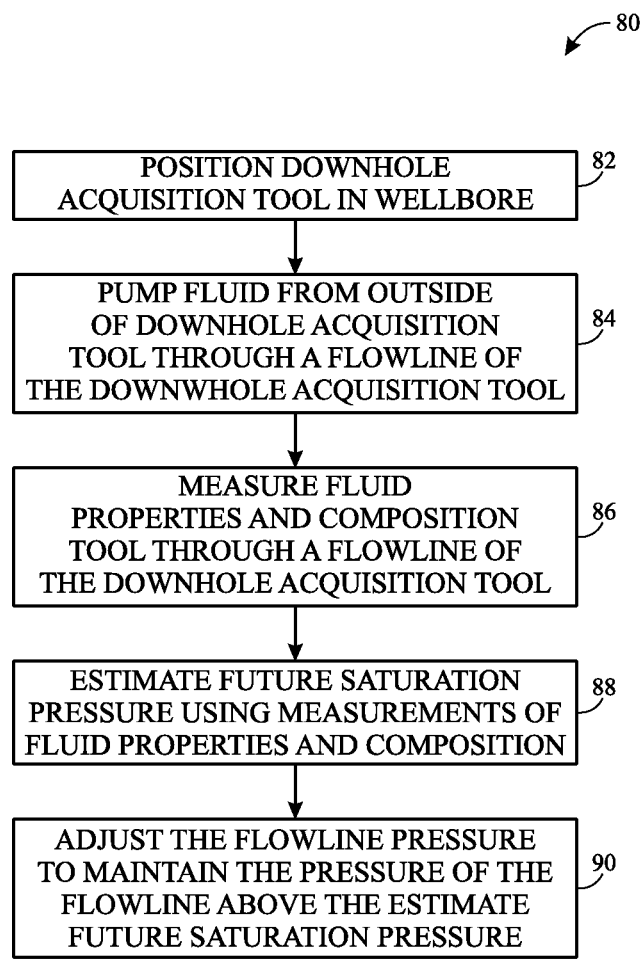
FIG. 4 is a process flow diagram of a method for controlling a pump in a downhole tool, in accordance with an embodiment of the present techniques.

To facilitate obtaining a representative sample (e.g., single phase and low contamination) of the formation fluid, it is desirable to control the pump 70 to maintain the pressure in the flowline 72 greater than the saturation pressure of fluid in the flowline 72 when the sample is taken. Accordingly, a process 80 for controlling the pump 70 during a sampling process is depicted in FIG. 4.

As will be described in more detail below, the process 80 includes positioning a downhole acquisition tool in a wellbore (process block 82). The formation fluid is pumped from outside of the downhole acquisition tool through a flowline of the downhole acquisition tool (process block 84) so that the formation fluid properties can be examined. Measurements of the fluid in the flowline can be taken (process block 86) to determine certain properties of the fluid and the composition of the fluid in the flowline. Using a saturation pressure model and the properties of the fluid measured, an estimated future saturation pressure can be calculated (process block 88). The pressure of the flowline may be adjusted to maintain the pressure of the flowline above the estimated future saturation pressure (process block 90).

Figure 5:
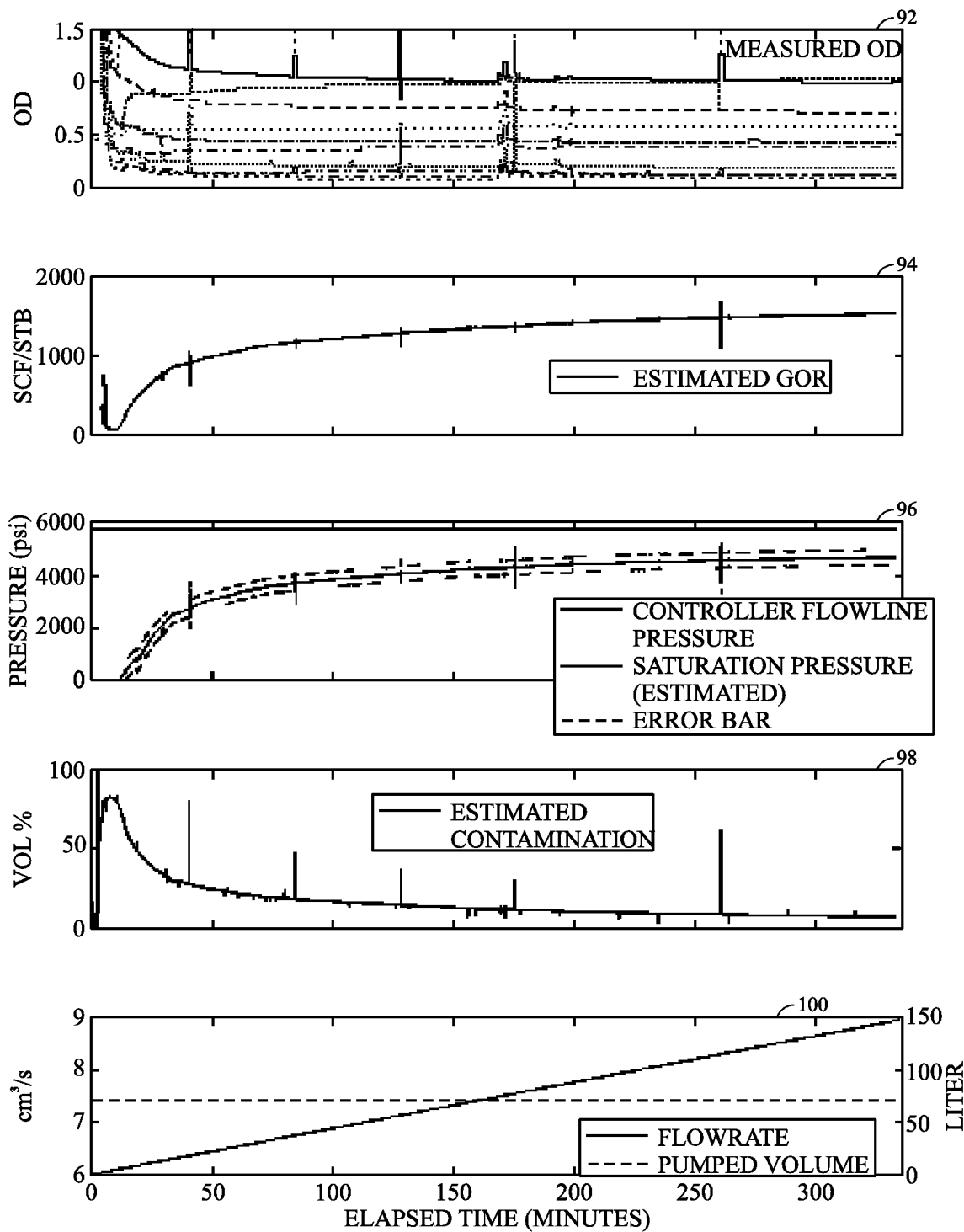
FIG. 5 is a plot illustrative of several characteristics of a sample fluid while a sampling-while-drilling operation is performed while a constant flowline pressure is maintained.
Figure 6:
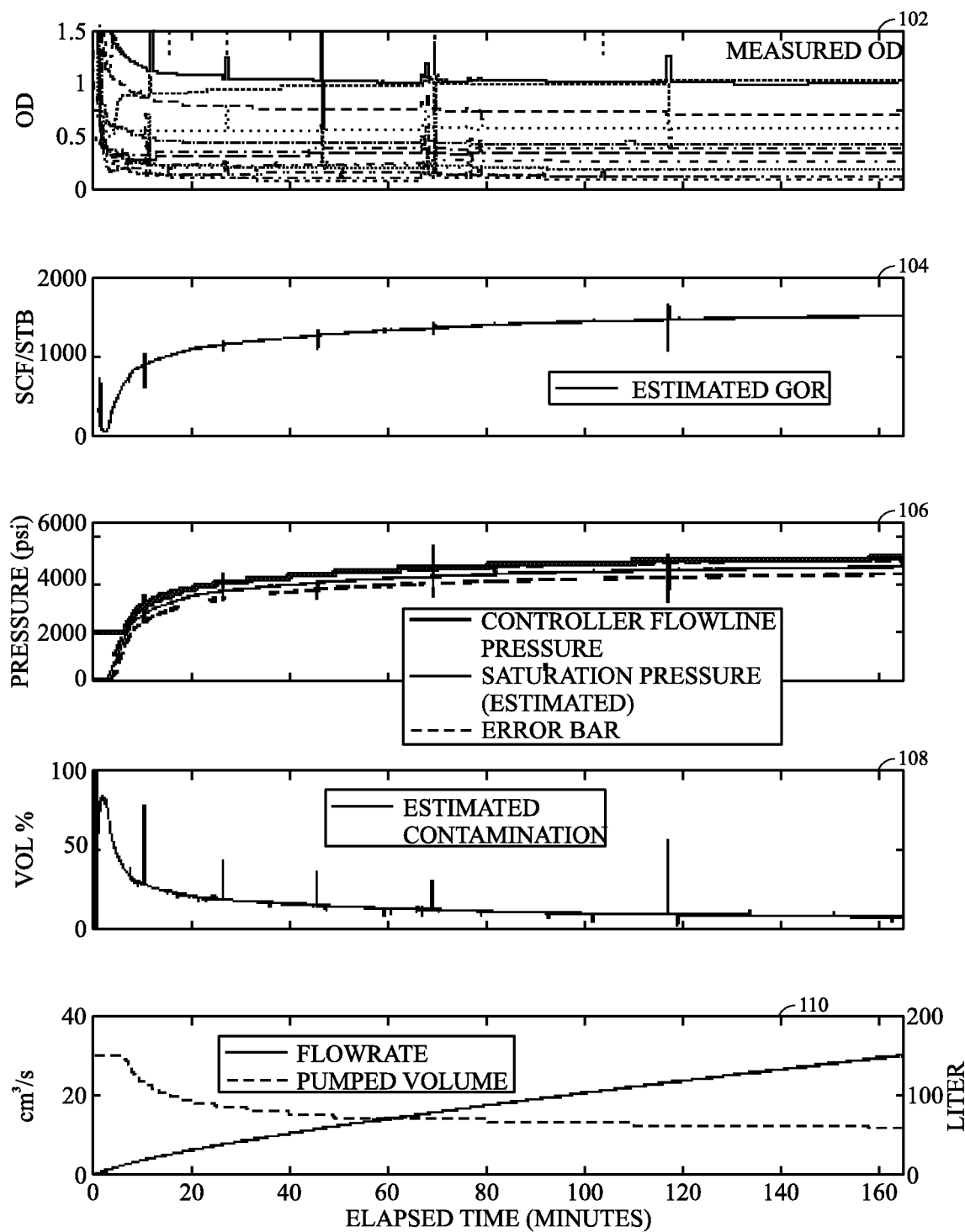
FIG. 6 is a plot illustrative of several characteristics of a sample fluid while a sampling-while-drilling operation is performed while the flowline pressure is controlled, in accordance with an embodiment of the present techniques.

An example of the improved contamination level by using the saturation pressure model is illustrated in FIGS. 5-6 by way of comparison. Specifically, FIG. 5 illustrates a sampling-while-drilling operation while a constant flowline pressure is maintained. The topmost plot illustrates measured optical density over numerous channels on the Y-axis versus time on the X-axis in minutes (block 92). The second plot illustrates an estimated gas to oil ratio, with gas to oil ratio measured in standard cubic feet per stock tank barrel on the Y-axis versus time on the X-axis (block 94). The third plot illustrates an estimated saturation pressure while the flowline pressure is controlled, where pressure in psi is on the Y-axis versus time on the X-axis (block 96). For example, the flowline pressure is controlled at or approximately 5,750 psi in the example. The fourth plot illustrates an estimated contamination level (block 98) in volume percent on the Y-axis and time on the X-axis. The fifth plot illustrates a flowrate and accumulated pumped volume versus simulated pumping time on the X-axis (block 100). FIG. 6 illustrates a sampling-while-drilling operation while the flowline pressure is controlled based on a future estimated saturation pressure plus the associated uncertainty. Here again, the topmost plot illustrates measured optical density over numerous channels on the Y-axis versus time on the X-axis in minutes (block 102). The second plot illustrates an estimated gas to oil ratio with gas to oil ratio measured in standard cubic feet per stock tank barrel on the Y-axis versus time on the X-axis (block 104). The third plot illustrates an estimated saturation pressure while the flowline pressure is controlled to be above the future estimated saturation pressure plus the uncertainty of the future estimated saturation pressure, using the techniques described herein. (block 106). The flowline pressure is measured in psi is on the Y-axis versus time on the X-axis. The fourth figure illustrates an estimated contamination level in volume percent on the Y-axis and time on the X-axis (block 108). The fifth plot illustrates a lowrate and accumulated pumped volume as a function of simulated pumping time (block 110).

As will be appreciated, a higher flowrate may be reached in the early pumping stages when the flowline pressure is controlled to be above the future estimated saturation pressure and its uncertainty (see FIG. 6) when compared to maintaining a substantially constant flowline pressure (see FIG. 5). As such, the contamination level can be reduced faster when the flowline pressure is maintained to be above the future estimated saturation pressure plus the uncertainty by using the saturation pressure model described herein. Accordingly, the pump operating time is reduced when the saturation pressure model is used to maintain the flowline pressure above the future estimated saturation pressure plus the uncertainty. Put another way, a greater reduction in contamination level can be achieved during a definitive operation time (e.g., during the same amount of operating time). The reduction in time to achieve a desired contamination level is further illustrated in FIG. 7.

Figure 7:
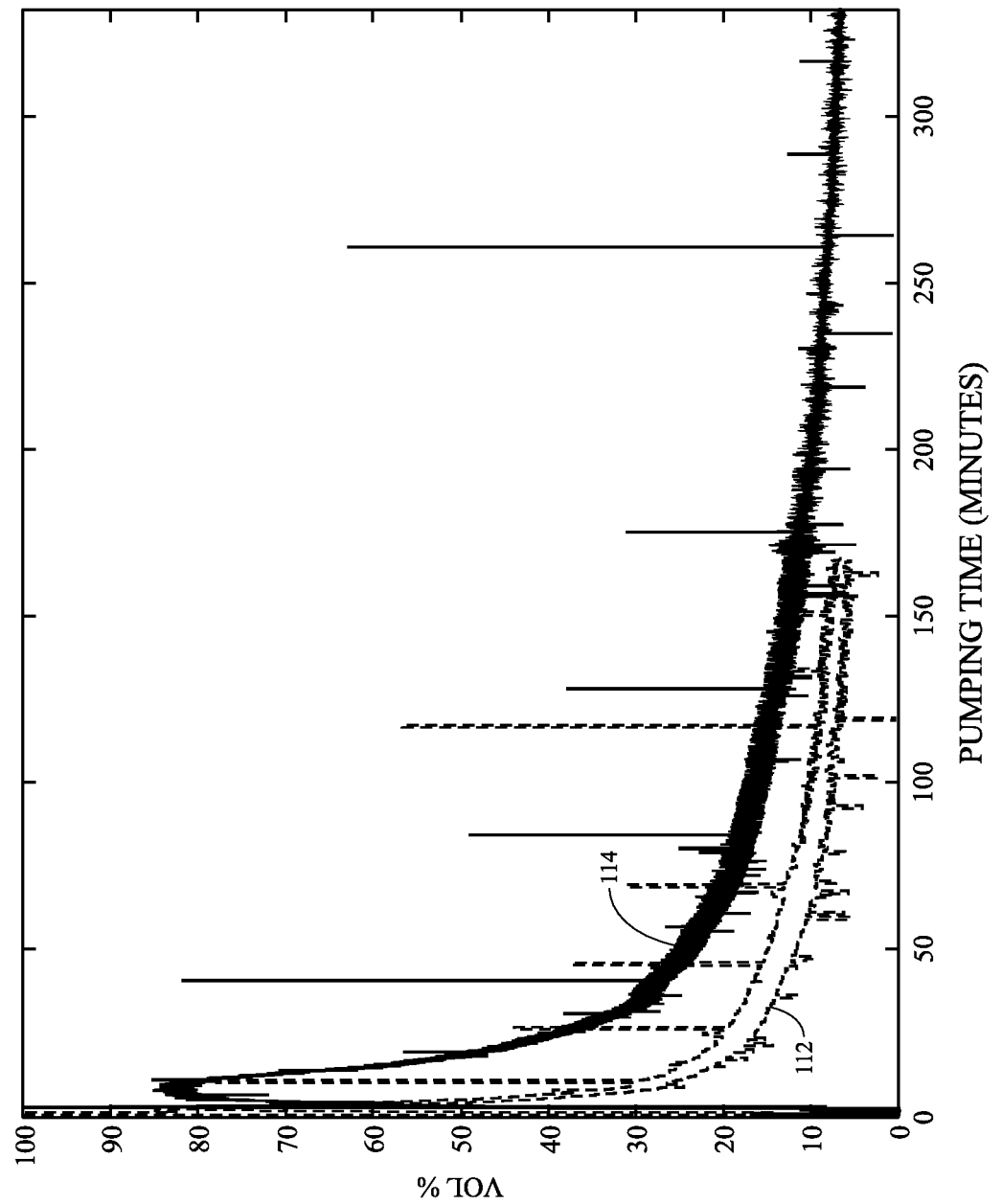
FIG. 7 is a plot representative of contamination level as a function of pumping time with constant flowline pressure versus controlled flowline pressure, in accordance with an embodiment of the present techniques.

FIG. 7 is a plot representative of contamination level as a function of pumping time with constant flowline pressure versus controlled flowline pressure. The contamination level is shown on the Y-axis, and the pumping time is shown on the X-axis. As illustrated, the contamination level when the flowline pressure is controlled using the saturation pressure model, the fluid reaches a lower contamination level in a shorter station time (e.g., line 112). For example, a desired reduction in contamination level can be achieved in approximately 160 minutes when the flowline pressure is controlled using the saturation pressure model (e.g., line 112). With constant flowline pressure (e.g., without use of the saturation pressure model, line 114), the same desired reduction in contamination level is achieved in over 300 minutes.

Estimated Future Saturation Pressure Model

As described above, the controlling the flowline pressure by using the saturation pressure model (e.g., the estimated future saturation pressure model) as described herein can reduce the contamination level can be reduced faster than when the flowline pressure is maintained at or around substantially constant pressure. Controlling the flowline pressure through the saturation pressure model includes maintaining to be above the future estimated saturation pressure plus the uncertainty. Using the saturation pressure model results in reduced pump operating time to achieve a desired reduction (e.g., target) contamination level.

As described in detail below, the saturation pressure model uses optical spectrometer data acquired during sampling operations. The saturation pressure model may utilize a variety of different computational methodologies, including but not limited to, multivariate analysis, artificial neural networks, Bayesian networks, support vector machines, and so forth.

In a first example, the saturation pressure model may be estimated by multivariate analyses. By way of example, a linear regression model including second order terms as described below can be used for estimated the saturation pressure of the flowline fluid:

$$f(T, \{x_i\}), a_T T + b_T T^2 + \sum_i a_i x_i + \sum_{i \leq j} \sum b_{ij} x_i x_j \ i, \quad (1)$$

$$j \in CO_2, C_1, C_2, C_3, C_4, C_5, C_{6+}$$

where, f is the estimated saturation pressure from temperature, T, and compositional inputs, $\{x_i\}$. Coefficients, $a_i$ and $b_{ij}$, are calibrated against the fluid library. Uncertainty of the estimate derived from the variability of the coefficients is also obtained as the variance of estimate as set forth below:

$$\Delta f_{model}^2 = \text{var}(f_{input}) = X \, \text{cov}(W) X^T \quad (2)$$

where, $X=[T, T^2, x_i, x_i x_j]$, $W=[a_T, b_T, a_i, b_{ij}]$, $j \in CO_2, C_1, C_2, C_3, C_4, C_5, C_{6+}$ An expected value of W can be obtained using a resampling technique, such as through using subsets of available data or drawing randomly with replacement from a set of data points (e.g., bootstrapping). The expected value of the coefficients is utilized in eq. (1) and therefore, the estimate from eq. (1) is the expected value of the saturation pressure. The uncertainty associated with the temperature and the estimate of the composition obtained by means of optical spectrometry can be determined using the following equation:

$$\Delta f_{input}^2 = \text{var}(f_{input}) = \sum_k \sum_l \frac{\partial f}{\partial X_k} \frac{\partial f}{\partial X_l} \Delta X_k \Delta X_l \quad (3)$$

where, $\Delta X_k$ denotes uncertainty of the inputs. Consequently, the uncertainty of the estimate combined eq. (2) and (3) is represented as follows:

$$\Delta f^2 = \Delta f_{model}^2 + \Delta f_{input}^2 \quad (4)$$

In a second example, the saturation pressure may be estimated by using an artificial neural network (ANN) based model. In this example, the ANN is based on eight input variable including Temperature (T), weight fraction of $CO_2$, $C_1$, $C_2$, $C_3$, $C_4$, $C_5$, and $C_6$. In this example, the eight input variables were validated against the saturation pressures of a portion (e.g., 70%) of randomly selected samples in a fluid library and validated against the remaining (e.g., 30%) of the samples in the fluid library. The input variables were connected to a hidden layer (e.g., system layers) by nine nodes with weights and biases. In the hidden layer, sigmoidal functions were employed as the activation function. This ANN is represented using an equation as set forth below:

$$f(X) = \sum_j w_j^{(1)} g_j \left( \sum_i w_{ij}^{(0)} x_i \right) \ (i \leq 8, j \leq 9), \quad (5)$$

$$\text{where } g(t) = \frac{2}{1+e^{-t}}$$

Figure 8:
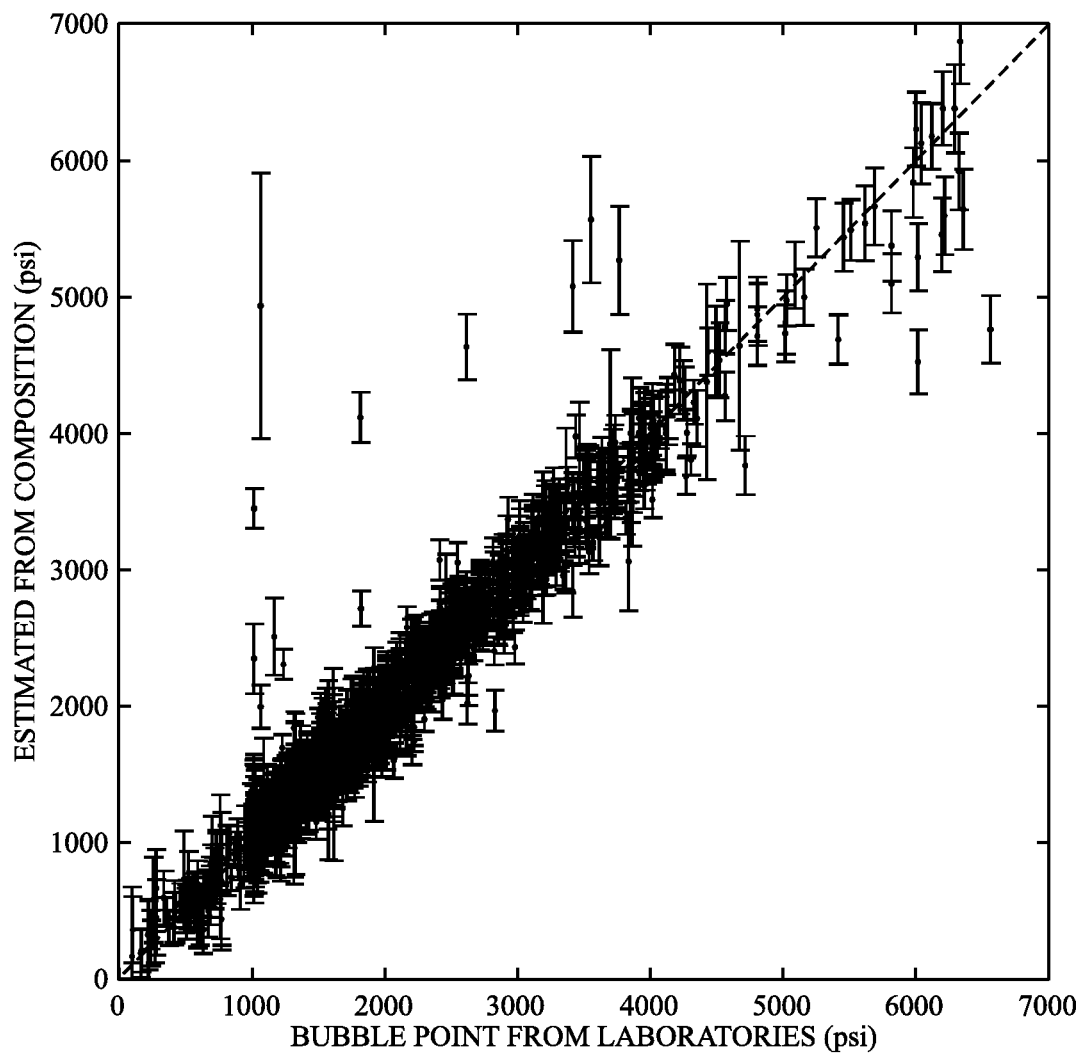
FIG. 8 is a plot representative of measured saturation pressure versus estimated saturation pressure determined from a saturation pressure model, in accordance with an embodiment of the pressure techniques.

Note that the biases (b) in the hidden and the output layers are, respectively, absorbed into the weights, $w^{(0)}$ and $w^{(1)}$. Using the ANN saturation pressure model described above, the estimation results calculated from the ANN saturation pressure model can be compared. Turning now to FIG. 8, the bubble point estimation of a fluid as estimated from the ANN saturation pressure model is plotted on the Y-axis in psi against the bubble points calculated from laboratory analysis in psi on the X-axis. Using the ANN saturation pressure model, a standard deviation of approximately 170 psi between the estimated bubble point and the laboratory analyzed can be observed.

The uncertainty is derived based on variability of weights in the neural networks. However, variability of weights in the hidden layer is not considered, and the variability is assumed to be absorbed into the variability of weights in the output layer. Consequently, the uncertainty of the prediction originated from the neural network model is approximately given:

$$\Delta f^2 \approx g \, \text{cov}(w^{(1)}) g^T \quad (6)$$

In a similar manner on the multivariate model (e.g., first example) described above, uncertainty originated from estimated composition is also obtained. To adjust for uncertainty, a parameter, $\alpha$, is introduced and applied to weight fraction of $C_{6+}$ ($x_{C6+}$) which is one of the inputs to the model, as set forth below:

$$x_{C6+} \rightarrow (1+\alpha) x_{C6+} \quad (7)$$

This adjustment implies to tune molecular weight of $C_{6+}$ component ($MW_{C6+}$). As the summation of the components in weight fraction should be equal to one, inputs of weight fraction should be normalized by the summation after the tuning parameter is applied, thus:

$$x_i \rightarrow \frac{x_i}{\sum_i x_i + (1+\alpha) x_{C6+}}, \ x_{C6+} \rightarrow \frac{(1+\alpha) x_{C6+}}{\sum_i x_i + (1+\alpha) x_{C6+}}, \quad (8)$$

$$i \in CO_2, C_1, C_2, C_3, C_4, C_5$$

When bubbles start emerged and light scattering is observed at time, t, the saturation pressure of the flowline fluid, $P_{sat}(t)$, should be nearly equal to the flowline pressure, $P_{FL}(t)$.

$$P_{sat}(t) \approx P_{FL}(t) \quad (9)$$

The parameter, $\alpha$, is to be adjusted to be satisfied:

$$\alpha' = \arg\min_\alpha \{P_{FL}(t) \sim \tilde{P}_{sat}(t, X(\alpha))\} (0 < \alpha < 1) \quad (10)$$

Where $\alpha'$ is the adjusted parameter, $\tilde{P}_{sat}$ is the estimated saturation pressure at time, t, and $X(\alpha)$ is the input to the model with the adjustment parameter, $\alpha$, as set forth below:

$$X(\alpha) = [T, x'_i, x'_{C6+}] \ (i \in CO_2, C_1, C_2, C_3, C_4, C_5) \quad (11)$$

$$x'_i = \frac{x_i}{\sum_i x_i + (1+\alpha)x_{C6+}}, \ x'_{C6+} = \frac{(1+\alpha)x_{C6+}}{\sum_i x_i + (1+\alpha)x_{C6+}} \quad (12)$$

Figure 9:
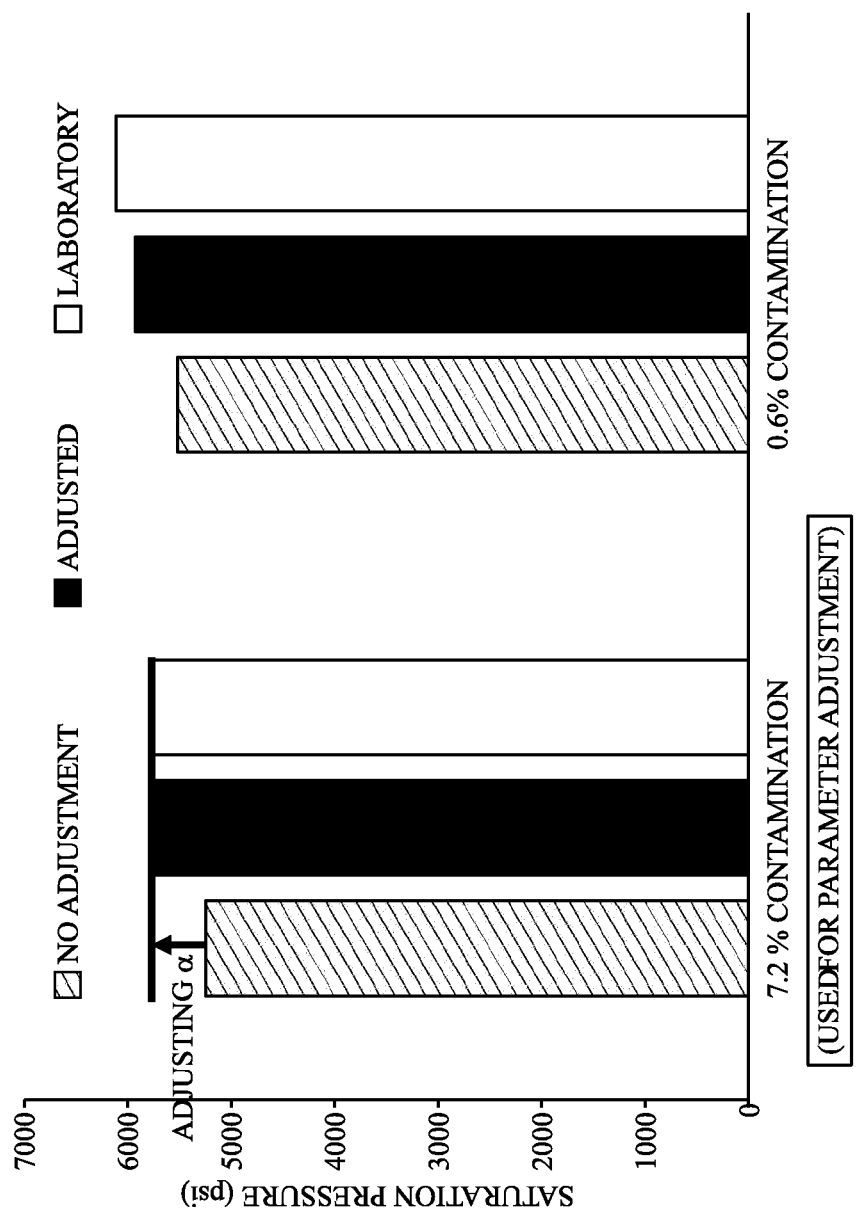
FIG. 9 is a graphical representation of measured saturation pressure versus estimated saturation pressure determined from the saturation pressure model, in accordance with an embodiment of the pressure techniques.

An example of estimating the saturation pressure using the saturation pressure model with and without the adjustment parameter, $\alpha$, is set forth below in FIG. 9. FIG. 9 is a graphical representation of measured saturation pressure versus estimated saturation pressure determined from a saturation pressure model, with and without tuning the model. The adjustment parameter was developed to enable the estimated saturation pressure to approach (e.g., get close) to the laboratory measured saturation pressure. In one example, the parameter, $\alpha$, was adjusted based on the saturation pressure at 7.2% contaminated crude oil. Here, the estimated saturation pressure before the adjustment is ~5246 psi in comparison with 5750 psi measured by a PVT laboratory.

Using the adjusted parameter, the saturation pressure of same crude oil (but at a different contamination level) was estimated. Before the adjustment the estimated saturation pressure is ~5520 psi in comparison with ~6110 psi laboratory measure saturation pressure. After the adjustment, the saturation pressure of 0.6% contaminated crude oil is estimated to be 5924 psi with the adjusted parameter, which is obtained from the 7.2% contaminated crude oil. Accordingly, adjusting the estimated saturation pressure with the adjustment parameter, $\alpha$, results in an improved (e.g., more accurate) estimate of saturation pressure of the sample.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A method comprising:
    pumping fluid from outside of a downhole tool through a flowline of the downhole tool with a pump;
    taking a first plurality of measurements over time using at least one sensor;
    estimating a future saturation pressure of the fluid within the flowline at constant time increments via a processor based at least in part on the first plurality of measurements and a saturation pressure model;
    adjusting the flowline pressure to maintain the pressure of the flowline above the estimated future saturation pressure; and
    operating a pump to maintain the flowline pressure above the estimated future saturation pressure plus uncertainty.

2. The method of claim 1, wherein estimating the saturation pressure of the fluid within the flowline takes place at least once per second.

3. The method of claim 1, wherein the first plurality of measurements includes optical density data, measured flowline temperature, or a combination thereof.

4. The method of claim 1, comprising executing the saturation pressure model using the first plurality of measurements.

5. The method of claim 1, comprising calculating an uncertainty of the estimated future saturation pressure.

6. The method of claim 1, comprising:
    measuring the fluid pressure of the flowline;
    comparing the measured fluid pressure to the estimated future saturation pressure; and
    adjusting operation of the pump based when the measured fluid pressure is less than the estimated future saturation pressure plus the uncertainty in a feedback control loop.

7. The method of claim 1, comprising using the saturation pressure model when the flowline pressure is less than a saturation pressure of the fluid.

8. A downhole fluid testing system comprising:
    a downhole acquisition tool housing configured to be moved into a wellbore in a geological formation, wherein the wellbore or the geological formation, or both, contain fluid that comprises a native reservoir fluid of the geological formation and a contaminant;
    a pump configured to pump fluid through the downhole acquisition tool to reduce a contamination level of the fluid;
    a plurality of sensors configured to analyze portions of the fluid and obtain a fluid property of the fluid, wherein at least one of the plurality of sensors is disposed uphole within the downhole acquisition tool and at least one of the plurality of sensors is disposed downhole of the downhole acquisition tool, wherein the plurality of sensors comprises an optical spectrometer configured to measure optical densities of the fluid in the flowline using a plurality of wavelengths, wherein the fluid property includes an optical density; and
    a controller configured to:
        take a first plurality of measurements over time using at least one of the plurality of sensors;
        estimate a future saturation pressure of the fluid within the flowline at constant time increments via a processor based at least in part on the first plurality of measurements and a saturation pressure model; and
        adjust the flowline pressure to maintain the pressure of the flowline above the estimated future saturation pressure.

9. The downhole fluid testing system of claim 8, wherein the data processing system is disposed within the downhole acquisition tool housing, or outside the downhole acquisition tool housing at the surface, or both partly within the downhole acquisition tool housing and partly outside the downhole acquisition tool housing at the surface.

10. The downhole fluid testing system of claim 8, wherein the downhole acquisition tool is a logging while drilling tool.

11. The downhole fluid testing system of claim 8, wherein estimating the saturation pressure of the fluid within the flowline takes place at least once per second.

12. The downhole fluid testing system of claim 8, wherein the first plurality of measurements includes optical density data, measured flowline temperature, or a combination thereof.

13. The downhole fluid testing system of claim 8, comprising executing the saturation pressure model using the first plurality of measurements.

14. The downhole fluid testing system of claim 8, comprising operating a pump to maintain the flowline pressure above the estimated future saturation pressure plus an uncertainty.

15. The downhole fluid testing system of claim 8, wherein the sensor comprises a multi-channel optical sensor comprising a spectrometer configured to measure a first optical density and a second optical density.

16. An apparatus comprising: at least one non-transitory, tangible, machine-readable media having instructions encoded thereon for execution by a processor, the instructions comprising:

instructions to take a first plurality of measurements over time using at least one sensor wherein the at least one sensor comprises a multi-channel optical sensor comprising a spectrometer configured to measure a first optical density and a second optical density;
 instructions to estimate a future saturation pressure of the fluid within the flowline at constant time increments via a processor based at least in part on the first plurality of measurements and a saturation pressure model; and
 instructions to adjust the flowline pressure to maintain the pressure of the flowline above the estimated future saturation pressure.

17. The apparatus of claim 16, wherein the computer instructions comprise instructions to execute the saturation pressure model using the first plurality of measurements.

18. The apparatus of claim 16, wherein the computer instructions comprise instructions to calculate an uncertainty of the estimated future saturation pressure.

* * * * *